US00RE34250E

United States Patent [19]

Van Leirsburg et al.

[11] E Patent Number: Re. 34,250

[45] Reissued Date of Patent: May 11, 1993

[54] PROCESS FOR REGENERATING SULFUR CONTAMINATED REFORMING CATALYSTS

[75] Inventors: Dean A. Van Leirsburg, Oklahoma City, Okla.; Donald H. Mohr, Albany, Calif.; Paul W. Tamm, Oakland, Calif.; Robert L. Jacobson, Vallejo, Calif.; Thomas R. Hughes, Orinda, Calif.; Charles R. Wilson, San Francisco, Calif.

[73] Assignee: Chevron Research and Technology Company, San Francisco, Calif.

[21] Appl. No.: 733,704

[22] Filed: Jul. 22, 1991

Related U.S. Patent Documents

Reissue of:

[64] Patent No.: 4,851,380
Issued: Jul. 25, 1989
Appl. No.: 80,111
Filed: Jul. 31, 1987

U.S. Applications:

[63] Continuation-in-part of Ser. No. 944,392, Dec. 19, 1986, abandoned.

[51] Int. Cl.[5] ..... B01J 29/38; B01J 38/45; B01J 38/42; C10G 35/095

[52] U.S. Cl. ..... 502/37; 208/140; 502/35; 502/36; 502/517

[58] Field of Search ..... 502/35-37, 502/517; 208/140

[56] References Cited

U.S. PATENT DOCUMENTS

| | | | |
|---|---|---|---|
| 3,287,257 | 11/1966 | Hansford et al. | 208/111 |
| 3,357,915 | 12/1967 | Young | 208/111 |
| 3,418,256 | 12/1968 | Rigney et al. | 252/415 |
| 3,950,491 | 4/1976 | Liederman et al. | 208/140 |
| 3,986,982 | 10/1976 | Crowson et al. | 208/111 |
| 4,191,633 | 3/1980 | Dauber | 208/140 |
| 4,377,495 | 3/1983 | Tse | 252/415 |
| 4,435,283 | 3/1984 | Buss et al. | 208/138 |
| 4,447,316 | 5/1984 | Buss | 208/138 |
| 4,456,527 | 6/1984 | Buss et al. | 208/138 |
| 4,482,637 | 11/1984 | Buss et al. | 502/37 |
| 4,518,708 | 5/1985 | Krishnamurthy et al. | 208/140 |
| 4,555,495 | 11/1985 | Krishnamurthy | 208/140 |
| 4,645,751 | 2/1987 | McCullen | 502/37 |

FOREIGN PATENT DOCUMENTS

| | | | |
|---|---|---|---|
| 0142352 | 9/1985 | European Pat. Off. | 502/37 |
| 86/02861 | 5/1986 | PCT Int'l Appl. . | |

*Primary Examiner*—Paul E. Konopka
*Attorney, Agent, or Firm*—Burns, Doane, Swecker & Mathis

[57] ABSTRACT

The present invention is a process for regenerating a sulfur-contaminated, highly selective, large-pore zeolite catalyst. It comprises a multistep process involving exposure of the catalyst to a combination of oxidizing conditions, reducing conditions and treatment with a halogen acid gas. These conditions are effective to agglomerate a Group VIII metal and remove sulfur. Thereafter, the catalyst is oxychlorinated to redisperse the Group VIII metal over the catalyst surface. A carbon removal step is optionally included.

33 Claims, No Drawings

PROCESS FOR REGENERATING SULFUR CONTAMINATED REFORMING CATALYSTS

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of U.S. Ser. No. 944,392, filed Dec. 19, 1986 now abandoned and which is hereby incorporated by reference in its entirety.

FIELD OF INVENTION

The present invention relates to regenerating sulfur-contaminated reforming catalysts. More specifically, this invention is directed to regenerating sulfur-contaminated monofunctional, zeolitic reforming catalysts containing at least one Group VIII metal.

BACKGROUND OF THE INVENTION

Within the past few years monofunctional, zeolitic reforming catalysts have become the object of considerable interest. A monofunctional reforming catalyst has little or no acidic catalytic activity, all of its activity for promoting aromatization reactions is provided by a Group VIII metal. The interest in these catalysts is primarily due to their surprisingly high selectivity for dehydrocyclizing paraffins to produce aromatics. See U.S. Pat. Nos. 4,104,320 to Bernard et al; 4,517,306 and 4,447,316 to Buss; and 4,434,331 and 4,435,283 to Buss et al. However, it has also been found that these catalysts are extremely sensitive to sulfur. They are almost totally deactivated by even a small contamination of sulfur. (For example, see U.S. Pat. No. 4,456,527 to Buss et al.) Accordingly, there is a need for a procedure for regenerating sulfur-contaminated monofunctional, zeolitic reforming catalysts containing a Group VIII metal.

A number of regeneration procedures have been proposed for removing sulfur from sulfur-contaminated bifunctional reforming catalysts (bifunctional catalysts have an acidic component, which provides additional catalytic functions of cracking and isomerization). For example, U.S. Pat. No. 2,853,435 granted on Sep. 23, 1958 to Evering et al; 2,892,770 granted on Jun. 30, 1950 to Caley et al; and 3,622,520 granted on Nov. 23, 1971 to Hayes. More recently, regeneration procedures have been disclosed for sulfur-contaminated bimetallic (having two metals, e.g., platinum/rhenium) bifunctional catalysts. For example, see U.S. Pat. Nos. 3,617,523 granted on Nov. 2, 1971 to Spurlock and 4,033,898 granted on Jul. 5, 1977 to Jacobson et al. However, these sulfur regeneration techniques are ineffective for the monofunctional zeolitic reforming catalysts.

Since the possibility of sulfur poisoning of the catalyst cannot be totally eliminated, even with stringent control of sulfur in the feed, the need for a sulfur regeneration procedure specifically for monofunctional zeolite catalysts is apparent.

Several prior art methods for regenerating monofunctional zeolite catalysts have been proposed. They claim to be effective for removing carbon and/or redistributing platinum. However, none of these methods recognizes or addresses deactivation by sulfur contamination or sulfur removal. For example, European Patent Application No. 0 142 352, filed on Nov. 9, 1984 describes a regeneration procedure for deactivated platinum/L zeolite catalysts. The deactivation remedied by this procedure is caused by coke deposition and platinum agglomeration, not by sulfur contamination. In addition, this European Patent application teaches that it is preferred to add some sulfur to the catalyst to reduce cracking. In the application there is a step to burn off carbonaceous matter and an oxychlorination step to redisperse the agglomerated platinum particles.

Another regeneration procedure for a monofunctional reforming catalyst is disclosed in U.S. Pat. No. 4,493,901 granted on Jan. 15, 1985 to Bernard et al. Bernard et al state that the regeneration procedure for coke deactivation may be improved by following an oxygen burn step and oxychlorination step with a hydration step. Sulfur contamination is not mentioned.

Accordingly, since no reference has addressed reactivation after sulfur contamination, there is a need for a regeneration procedure which can restore the activity of monofunctional zeolitic catalysts which have been deactivated in whole or in part by sulfur contamination. This need has now been satisfied by the invention which is summarized and then detailed below.

SUMMARY OF THE INVENTION

According to the present invention, a process is provided for regenerating a sulfur-contaminated reforming catalyst which comprises a zeolite and a Group VIII metal. The process comprises agglomerating the Group VIII metal and thereafter removing sulfur from the catalyst. Preferably the Group VIII metal is platinum, rhodium, ruthenium, iridium, or osmium, most preferably platinum.

A key feature in the process of the present invention is the degree of agglomeration of the Group VIII metal prior to sulfur removal from the catalyst. For example, for a sulfur contaminated, platinum containing catalyst, it is preferred to form platinum agglomerates of greater than 50 Å in diameter, more preferably greater than 75 Å in diameter, and still more preferably greater than 150 Å in diameter. The amount of platinum on the catalyst which is agglomerated is preferably greater than 50 wt. % of the total platinum, more preferably greater than 75 wt. %, most preferably greater than 90 wt. %.

The catalyst preferably comprises platinum on a large pore zeolite. Most preferably the zeolite is L zeolite.

Among other factors, the present invention is based on our finding that, unexpectedly, contaminant sulfur can be effectively removed from a zeolitic catalyst having a Group VIII metal by a process which operates by intentionally agglomerating the Group VIII metal into large agglomerates and then treating the catalyst with a halogen acid gas. According to one preferred embodiment of the present invention, we have found that carbon monoxide and a halogen acid, preferably hydrogen chloride, must be contacted with the catalyst as a mixture, to accomplish both agglomeration and sulfur removal.

Metal agglomeration is accomplished either in (a) an oxidizing gas, or (b) a carbon monoxide/halogen acid gas. After, or concurrent with, the agglomeration, the sulfur is removed with a halogen acid.

In method (a) platinum agglomeration and subsequent sulfur removal preferably is accomplished by steps comprising (1) contacting the catalyst with a gas comprising between 1 vol. % and 50 vol. % oxygen, at a temperature between 800° F. and 1200° F., at a gas rate between 50 and 5000 GHSV and a pressure between 1 and 30 atmospheres for a time between 1 and 100 hours; and (2) contacting the catalyst with a gas comprising greater than 0.1% hydrogen chloride in hydrogen for greater than 1 hour at a temperature between 800° F. and 1200° F., at a pressure between 1 and 30 atmospheres, and a gas rate between 50 and 5000 GHSV.

In method (b) platinum agglomeration and sulfur removal preferably is accomplished by one or more steps comprising contacting the catalyst with a gas comprising at least 2 vol. % carbon monoxide and greater than 0.1 vol. % hydrogen chloride at a temperature between 800° F. to 1200° F. for greater than 1 hour, at a gas rate between 50 and 5000 GHSV and a pressure of between 1 and 30 atmospheres.

In a more preferred embodiment, the present invention comprises a carbon removal step, a sulfur removal step, and a platinum redispersion step. The carbon removal step preferably comprises contacting the catalyst with a gas comprising between 0.1 vol. % and 2.0 vol. % oxygen, at a temperature between 500° F. and 900° F., at a gas rate between 50 and 500 GHSV for a time between 1 and 24 hours to remove carbon from the catalyst prior to agglomerating the platinum. The platinum redispersion step preferably comprises contacting the catalyst with a chloride or chlorine-containing gas in the presence of an oxygen-containing gas; purging the catalyst with a dry inert gas at a temperature between 600° F. and 1000° F.; and contacting the catalyst with dry hydrogen at a temperature between 600° F. to 1000° F.

DETAILED DESCRIPTION OF THE INVENTION

The following discussion presents a more detailed description of the present invention for regenerating sulfur contaminated catalysts.

The Catalysts

Catalysts that can be advantageously regenerated by the process of the present invention comprise a Group VIII metal component and a zeolite component. Preferably the zeolite is a large or an intermediate pore zeolite.

An example of an intermediate pore zeolite is silicalite. It has an apparent pore size between 5 Å and 6 Å.

A composition of silicalite expressed in terms of mole ratios of oxides in the anhydrous state, may be represented as follows:

$$0.9\pm0.2\ [xR_2O+(1-x)M_{2/n}O]:<0.005\ Al_2O_3:>1\ SiO_2$$

where M is a metal, other than a metal of Group IIIA, n is the valence of said metal, R is an alkyl ammonium radical and x is a number greater than 0 but not exceeding 1.

Silicalite is described in U.S. Pat. Nos. 4,309,275; 4,579,831; 4,517,306; and Re. 29,948, all of which are incorporated herein by reference in their entirety. Silicalite may also contain metals from either Group IA or IIA.

Large pore zeolites are defined as zeolites having an effective pore diameter between 6 and 15 Å. The process of the present invention may be applied to catalysts containing type L zeolite, zeolite X, zeolite Y and faujasite. All of these zeolites have apparent pore sizes on the order of 7 to 9 Å.

The composition of type L zeolite, expressed in terms of mole ratios of oxides, may be represented as follows:

$$(0.9\text{–}1.3)M_{2/n}O:Al_2O_3(5.2\text{–}6.9)SiO_{2:y}H_2O$$

wherein M designates a cation, n represents the valence of M, and y may be any value from 0 to 9. Zeolite L, its X-ray diffraction pattern, its properties, and method for its preparation are described in detail in U.S. Pat. No. 3,216,789 which is incorporated herein by reference in its entirety. The real formula may vary without changing the crystalline structure; for example, the mole ratio of silicon to aluminum (Si/Al) may vary from 1.5 to 3.5.

The chemical formula for zeolite Y expressed in terms of mole oxides may be written as:

$$(0.7\text{–}1.1)Na_2O:Al_2O_3:xSiO_{2:y}H_2O$$

wherein x is a value between 3 and 6, and y may be a value up to about 9. Zeolite Y has a characteristic X-ray diffraction pattern which may be employed with the above formula for identification. Zeolite Y is described in more detail in U.S. Pat. No. 3,130,007, U.S. Pat. No. 3,130,007 is hereby incorporated by reference in its entirety to show a zeolite useful in the present invention.

Zeolite X is a synthetic crystalline zeolitic molecular sieve which may be represented by the formula:

$$(0.7\text{–}1.1)M_{2/n}O:Al_2O_3:(2.0\text{–}3.0)SiO_2YH_2O$$

wherein M represents a metal, particularly alkali and alkaline earth metals, n is the valence of M, and y may have any value up to about 8 depending on the identity of M and the degree of hydration of the crystalline zeolite. Zeolite X, its X-ray diffraction pattern, its properties, and method for its preparation are described in detail in U.S. Pat. No. 2,882,244. U.S. Pat. No. 2,882,244 is hereby incorporated by reference in its entirety to show a zeolite useful in the present invention.

The zeolite catalysts that can be regenerated by the present invention preferably contain exchangeable cations. Common cations that are useful for catalysts of this invention are in Groups IA (alkali metals) and IIA (alkaline earth metals). When alkali metals are used, sodium, potassium, lithium, rubidium, or cesium are preferred. When Group IIA, alkaline earth metals are used, either barium, calcium, or strontium is preferred. However, barium is most preferred. The alkaline earth metal can be incorporated into the zeolite by synthesis, impregnation or ion exchange.

In the present regeneration process it is important for the catalyst to contain at least one Group VIII metal. Preferably, the Group VIII metals are: e.g., ruthenium, rhodium, osmium, iridium or platinum, more preferably platinum, iridium, and most preferably platinum. (When reference is made to a specific Group VIII metal in this application it is used as a representative of the group.) The preferred percentage of Group VIII metal in the catalyst is between 0.1% and 5%.

Group VIII metals are introduced into the largepore zeolite during synthesis, or after synthesis by impregnation or exchange using an aqueous solution of an appropriate salt. If it is desired to introduce two Group VIII metals into the zeolite, the operation may be carried out simultaneously or sequentially.

By way of example, platinum can be introduced by impregnating or ion exchanging the zeolite with an aqueous solution of tetrammineplatinum (II) nitrate $[Pt(NH_3)_4](NO_3)_2$, tetrammineplatinum (II) chloride $[Pt(NH_3)_4]Cl_2$, or dinitrodiamino-platinum $[Pt(NH_3)_2(NO_2)_2]$.

An inorganic oxide is preferably used as a matrix to bind the catalyst. This binder can be a natural or a synthetically produced inorganic oxide or combination of inorganic oxides. Typical inorganic oxide binders which can be used include clays, alumina, and silica. Acidic sites on the binder are preferably exchanged by cations which do not impart strong acidity (such as Na, K, Rb, Cs, Ca, Sr, or Ba).

The regeneration process of the present invention may be used on catalysts in the form of extrudates, pills, pellets, granules, broken fragments, or various other special shapes. These catalysts can become deactivated by sulfur when used in any of the conventional types of equipment used for catalytic reforming.

Sulfur Contamination

The sulfur sensitivity of the preferred largepore zeolite catalysts mentioned above is known as shown in U.S. Pat. No. 4,456,527 to Buss et al which is hereby incorporated by reference in its entirety. Buss et al state that, during reforming, the sulfur level in the feed must be kept below 100 ppb, and more preferably, below 50 ppb. Keeping the sulfur in the feed below this level will allow an acceptable run length. Inevitably, however, sulfur will build up on the catalyst, either by an unforeseen excursion or by slow accumulation, forcing regeneration of the sulfur contaminated catalyst. As sulfur deposits on the catalyst, the temperature of the reactor must be increased to keep the conversion constant. This can be done until a maximum temperature limit is reached (approximately 950° F. to 1000° F., set either by process selectivity or reactor metallurgy). Regeneration is usually required when approximately 1 sulfur atom per 10 platinum atoms accumulates on the catalyst.

Carbon Removal

During reforming, carbon also accumulates on the catalyst and it must also be periodically removed. In a preferred embodiment of the present invention, carbon is removed with a carbon burn in an oxygen-containing atmosphere prior to sulfur removal. During the carbon burn, the amount of oxygen ranges between 0.1 vol. % and 2.0 vol. %. (For purposes of this application, all gas volumes represent vol. %.) When more than 0.5% oxygen is present in the gas, care should be taken to minimize the catalyst temperature until the carbon level has been substantially reduced. Nitrogen or another inert gas is preferably present in a sufficient amount to make up the remainder of the gas. The Gas Hourly Space Velocity (GHSV) for the carbon burn preferably ranges between approximately 50 and 5000 GHSV, or more preferably between 150 and 1500 GHSV. The pressure preferably ranges between 1 and 30 atmospheres, or more preferably between 1 and 10 atmospheres. The temperature preferably ranges between 500° F. and 900° F. The time for this carbon burn step is preferably between 1 and 24 hours. It can be longer, provided that it is economically practical based on reactor down time.

Regeneration of a Sulfur Contaminated Catalyst

Regeneration of sulfur contaminated catalysts is accomplished by a process which comprises intentionally agglomerating the platinum on the catalyst and removing the sulfur with a halogen acid gas. The regeneration process has at least two basic embodiments. In one embodiment the platinum is agglomerated in an oxidizing gas at high temperature. Then sulfur is removed with a halogen acid gas. In another embodiment the platinum is agglomerated and the sulfur is removed in one step with a carbon monoxide/halogen acid gas mixture.

Preferably, the platinum on the catalyst is agglomerated into agglomerates that are greater than 50 Å in diameter, more preferably greater than 75 Å in diameter, and still more preferably greater than 150 Å in diameter. The amount of platinum on the catalyst which is agglomerated is preferably greater than 50 wt. % of the platinum, more preferably greater than 75 wt. %, most preferably greater than 90 wt. %. It is understood the platinum agglomerates may have different shapes and that their "diameters" may vary. They may be spherical, cubic, pyramidal, cuboctahedral, or irregular in shape. The term "diameter" is used in a general sense to indicate a characteristic dimension of the agglomerates, even though the agglomerates are not necessarily spherical in shape.

Agglomeration in an Oxidizing Gas

This embodiment is abbreviated as AIOG, Agglomeration In an Oxidizing Gas. The overall conditions that are necessary to produce agglomeration in this embodiment are more severe than those in the carbon burn, even though some of the conditions of these treatment steps may overlap.

When the platinum is agglomerated in an oxidizing gas, the gas preferably contains between 1 vol. % and 50 vol. % oxygen, or more preferably between 2 vol. % and 21 vol. % oxygen in the total gas volume. Preferably, the oxygen is diluted with an inert gas, such as nitrogen. The AIOG temperature is preferably between 800° F. and 1200° F., more preferably between 900° F. and 1050° F. The time for the oxidation is preferably between 1 hour and 100 hours, more preferably between 8 and 50 hours. However, to agglomerate the platinum to the desired level it should be understood that the factors of time, temperature, and oxygen concentration may vary in relation to one another and one factor may need to be increased to compensate for the insufficiency of another.

The AIOG is carried out at a pressure between 1 and 30 atmospheres, or more preferably between 1 and 10 atmospheres. The gas rate preferably ranges between 50 and 5000 GHSV, and more preferably between 150 and 1500 GHSV.

Following the AIOG, a reducing gas is contacted with the catalyst to convert the oxidized sulfur to a form which can be removed from the catalyst with a halogen acid gas. Hydrogen, carbon monoxide, or another reducing gas (such as a light hydrocarbon) can constitute part or the total amount of the gas. The concentration of the reducing gas is preferably greater than 10% or more preferably between 50% and 99% of the total gas volume. In this embodiment hydrogen is preferred as the reducing gas for practical considerations, such as availability, purity, lack of toxicity, etc.

To remove the reduced sulfur, we have found it preferable to contact the catalyst with a halogen acid gas, either in a subsequent treating step or more preferably, by simultaneous contact with the reducing gas. (The treatment gases should not contain any sulfur.) Examples of halogen acids are hydrogen chloride, hydrogen bromide, and hydrogen iodide. Hydrogen chloride is especially preferred. Hydrogen fluoride is not preferred. For purposes of this application, the term "halogen acid" (or any specific halogen acid) also means any precursor which will form the halogen acid gas in situ under the specific conditions in which it is employed. For example, precursor compounds of hydrogen chloride are phosgene, $CH_3Cl$, $CH_2Cl_2$ and $CCl_4$, etc.

If the halogen acid gas is contacted with the catalyst in a step subsequent to reduction, then it may be present in a carrier gas. A preferred carrier is either an inert gas, such as nitrogen, or a reducing gas. The halogen acid gas preferably comprises greater than 0.1% of the total gas volume, more preferably greater than 1%, and most preferably between 2% and 5%. The reducing gas and the gas containing the halogen acid are preferably contacted with the catalyst in a temperature range between 800° F. and 1200° F., more preferably between 800° F. and 1000° F., and most preferably between 900° F. and 1000° F. The pressure is preferably between 1 and 30 atmospheres, and more preferably between 1 and 10 atmospheres. The gas rate should be preferably between 50 and 5000 GHSV, and more preferably between 150 and 1500 GHSV. The time that the catalyst is contacted with the reducing gas and the gas containing the halogen acid is preferably greater than 1 hour, more preferably between about 8 and 50 hours, but can include any commercially practical time.

The gas containing the halogen acid can be prepared in many different ways, but one example of its preparation could be to saturate a carrier gas by intimate contact with an aqueous solution of a halogen acid. Further agglomeration of the platinum may occur during the sulfur removal step.

Agglomeration in a Carbon Monoxide Halogen Acid Mixture

This embodiment is abbreviated as COAG, Carbon monoxide halogen Acid Gas. In the COAG embodiment, preferably, a gaseous mixture of carbon monoxide (CO) and a halogen acid are contacted with the catalyst simultaneously to both agglomerate the platinum and to remove the sulfur. In this embodiment, CO and the halogen acid (HCl for example) must be mixed together. The gas combination is called the COAG mixture.

As in the previous embodiment, the halogen acid gas can be generated in situ from a compound that forms the halogen acid under the conditions of this step. Examples of hydrogen chloride precursors are phosgene, $CH_3Cl$, $CH_2Cl_2$, or $CCl_4$, etc. The halogen acid gas may be drawn from the list given in the previous embodiment. In this embodiment, HCl is again preferred. The amount of halogen acid (e.g., HCl) in the COAG mixture is preferably greater than 0.1%, more preferably greater than 1%. Preferably, the CO concentration should be greater than 2% with a more preferred range of 50% to 99%. The COAG mixture is contacted with the catalyst at a temperature preferably ranging between 800° F. and 1200° F., more preferably between 800° F. and 1000° F., and most preferably between 900° F. and 1000° F. The pressure is preferably between 1 and 30 atmospheres, more preferably between 1 and 10 atmospheres. The gas rate is preferably between 50 and 5000 GHSV, or more preferably between 150 and 1500 GHSV. The time that the catalyst is contacted with the COAG mixture is preferably greater than 1 hour, more preferably greater than 3 hours, and most preferably greater than 24 hours.

The COAG mixture can be prepared in different ways, but one example of its preparation is to saturate a stream of 100% CO by intimate contact with an aqueous HCl solution. Water is preferably present in the mixture between 0 and 10%, but it is not required.

Platinum Redispersion

As a consequence of the foregoing steps of the present invention, the Group VIII metal (for example platinum) atoms have become severely agglomerated. The average size of the agglomerates are typically between 150 and 300 Å in diameter with each one containing approximately 200,000 to 2,000,000 platinum atoms. If the catalyst is to have an appreciable activity for aromatization, the platinum must be redispersed within the zeolite in the form of platinum particles preferably smaller than 50 Å, more preferably smaller than 25 Å, most preferably smaller than 10 Å.

There are many redispersion procedures available. However, a preferred mode for Group VIII metal redispersion is an oxychlorination procedure which comprises contacting the catalyst at elevated temperature with an oxygen-containing gas and a chloride-containing gas followed by a nitrogen purge and a hydrogen reduction. The three major steps are outlined below.

In the first step, the catalyst having platinum agglomerates is contacted with a gaseous mixture of oxygen, water, and chlorine or a chloride. Oxygen is preferably present in a concentration of greater than 0.1%, more preferably between 1% and 21%, and more preferably between 2% and 6% of the total gas volume. Water is preferably present from 0% to 10%, more preferably from 1% to 4%, and most preferably from 2% to 3%. The chloride or chlorine is preferably present in an amount sufficient to achieve a ratio of chlorine to platinum atoms of greater than 4:1, more preferably between 4:1 and 1000:1, or still more preferably between 5:1 and 200:1, and most preferably between 10:1 and 50:1. Either a chlorine or a chloride-containing gas can be used, however it is preferred that a chloride be used, for example, hydrogen chloride or an organic chloride, such as carbon tetrachloride, etc. The preferred temperatures in this first step of the oxychlorination procedure are between 800° F. and 1100° F., or more preferably between 900° F. and 1000° F., and most preferably between 925° F. and 975° F. The time for this first step is preferably between 1 and 24 hours, and more preferably between 1 and 3 hours. The gas rate is preferably between 50 and 5000 GHSV, more preferably 150 and 1500 GHSV. Pressure is preferably between 1 and 30 atmospheres, more preferably between 1 and 10 atmospheres.

In the second step, the catalyst is preferably contacted with dry nitrogen (or another inert gas) for a time sufficient to purge the catalyst bed of oxygen. In this application "dry" means preferably less than 1000 ppm water, more preferably less than 500 ppm water, and most preferably less than 100 ppm water. This purge time is preferably between 0.1 and 5 hours, more preferably between 0.1 and 2 hours, and most preferably between 0.5 and 1 hour. The temperature is preferably between 600° F. and 1000° F., more preferably between 850° F. and 950° F., and most preferably between 875° F. and 925° F. The gas rates and pressures are preferably in the same ranges as in the first step.

In the third and final step, the catalyst is contacted with dry halogen for a time sufficient to reduce substantially all of the platinum. As stated above, dry means preferably less than 1000 ppm water, more preferably less than 500 ppm water, and most preferably less than 100 ppm water. The time for this step is dependent on the flow and the reduction temperature. A short time is preferred based on commercial considerations, for example, preferably less than 5 hours, and more preferably less than 2 hours. The temperature is preferably between 600° F. and 1000° F., more preferably between 800° F. and 950° F., and most preferably between 875° F. and 925° F. The gas velocities and pressures are preferably in the same ranges as the first and second steps.

An oxygen post-treatment step can be inserted between the first (oxychlorination) and second (nitrogen purge) steps. In the oxygen post-treatment, the catalyst is preferably contacted for up to 3 hours with an oxygen-containing gas having an oxygen concentration greater than 0.1%, or more preferably between 1% and 21%. The temperature is preferably between 800° F. and 1000° F., more preferably between 900° F. and 975° F. Water is preferably present in an amount between 0 and 10%, more preferably 1% to 4%, and most preferably between 2% and 3%. The gas velocities and pressures are preferably in the same ranges as the oxychlorination procedure.

The following examples are presented here as specific embodiments of the overall concept of the invention. They are summarized in Table I. It is intended that they be exemplary and not restrictive in any way.

EXAMPLES

All the subsequent steps of Examples 1 through 13 were carried out at a pressure of 1 atmosphere and a gas flow rate of 150 GHSV. Examples 1-7 describe sulfur removal in accordance with the COAG embodiment. Examples 1-3 show that at least 50% of the sulfur can be removed with a mixture of CO, HCl, and $H_2O$ in at least 3 hours and that 94% of the sulfur can be removed in 102 hours. These examples also show that more sulfur is removed when larger platinum agglomerates are formed.

EXAMPLE 1

A catalyst, comprising 0.8 wt. % platinum on a barium potassium L zeolite containing 8 wt. % barium, was sulfided until it accumulated 325 ppm sulfur and was substantially deactivated for paraffin dehydrocyclization (as measured by an isothermal test where a light naphtha fed containing mostly $C_6$-$C_8$ paraffins was reformed at 920° F., 100 psig and 6 LHSV). This catalyst will be called "Catalyst A", and samples will also be used in later examples.

Catalyst A was treated in accordance with the COAG embodiment, Catalyst A was contacted with a gaseous stream of 1% $O_2$ in 99% $N_2$ at 900° F., for 16 hours. Then it was contacted with a gaseous stream of CO which had been bubbled through a 34.5 wt. % HCl solution at room temperature. This gave a nominal gas composition of approximately 0.5% $H_2O$, 10% HCl, and the remainder CO. This treatment was carried out over 102 hours at 900° F. Afterward, the catalyst was cooled down in flowing nitrogen to ambient temperature. The sulfur concentration of the catalyst after treatment was 20 ppm. Transmission Electron Microscopy (TEM) photographs showed that the catalyst contained platinum agglomerates in the range between 40 and 340 Å in diameter. The most abundant agglomerate size was 180 Å. Seventy percent (70%) of the agglomerate diameters were between 140 and 240 Å.

EXAMPLE 2

Another catalyst comprising 0.8 wt. % platinum on a barium-potassium L-zeolite containing 8 wt. % barium, was subjected to sulfiding until it accumulated approximately 400 ppm sulfur and was substantially deactivated for paraffin dehydrocyclization. This catalyst will be called "Catalyst B", and samples will also be used in other examples.

Catalyst B was also treated in accordance with the COAG embodiment. Catalyst B was contacted with a gaseous stream of 1% $O_2$ in 99% $N_2$, at 900° F., for 19 hours. Then it was contacted with a gaseous stream of CO which had been bubbled through a 32 wt. % aqueous HCl solution at room temperature. This gave a nominal gas composition of 3.5% HCl, 1% $H_2O$, and the remainder CO. Exposure to the reducing gas was carried out for 24 hours at 900° F. Afterward, the catalyst was cooled down in flowing nitrogen to ambient temperature. The sulfur concentration after treatment was 78 ppm. The platinum agglomerate size was between 30 and 80 Å.

EXAMPLE 3

Another sample of Catalyst A was treated in accordance with the COAG embodiment. Catalyst A was contacted with a gaseous stream of 1% $O_2$ in 99% $N_2$ at 900° F. for 24 hours. Then it was contacted with a gaseous stream of CO which had been bubbled through a 34.5 wt. % HCl solution to give a nominal gas composition of 10% HCl, 0.5% $H_2O$, and the balance of CO. It was treated with this gas at 900° F. for 3 hours. Finally, the catalyst was cooled down to room temperature in flowing nitrogen. The sulfur concentration after treatment was 160 ppm.

EXAMPLE 4

Comparing Examples 4 and 2 shows that sulfur can be removed from the catalyst without the preliminary oxidation step.

Another sample of Catalyst B was also treated in accordance with the COAG embodiment. Catalyst B was contacted with a gaseous stream of CO which had been bubbled through a 32 wt. % aqueous HCl solution at room temperature. This gave a nominal gas composition of 3.5% HCl, 1% $H_2O$, and the remainder CO. Exposure to this gas was carried out for 21 hours at 900° F. Afterward, the catalyst was cooled down in flowing nitrogen to ambient temperature. The sulfur concentraion after treatment was 138 ppm.

EXAMPLE 5

Comparing Example 5 to Examples 1-3 shows that sulfur can be removed in a shorter time by increasing the temperature.

Another sample of Catalyst A was also treated in accordance with the COAG embodiment. Catalyst A was oxidized in 1% $O_2$ in 99% $N_2$ at 980° F. for 3 hours. Then it was treated with a gas mixture containing 3.5% HCl, 1% $H_2O$, and the remainder CO at 1050° F. for 3 hours. The catalyst was then cooled down to room temperature in flowing nitrogen. The sulfur concentration after treatment was 98 ppm.

EXAMPLE 6

Example 6 shows that water is not necessary to achieve sulfur removal.

Another catalyst comprising 0.8 wt. % platinum on a barium potassium L-zeolite containing 8 wt. % barium, was sulfided until it accumulated 440 ppm of sulfur and was substantially deactivated as measured by paraffin dehydrocyclization.

The deactivated catalyst was also treated in accordance with the COAG embodiment. The catalyst was first contacted with a gaseous stream of 1% $O_2$ in 99% $N_2$ at 900° F. for 3 hours. Subsequently, it was contacted with a mixture of 50% HCl and 50% CO at 900° F. for 3 hours. The sulfur concentration of the catalyst after treatment was 184 ppm.

EXAMPLE 7

Example 7 shows that a halogen acid precursor may be used to remove sulfur from the catalyst.

Another sample of Catalyst B was treated in accordance with the COAG embodiment, except that carbon tetrachloride ($CCl_4$) was used as the source of the halogen acid gas. The catalyst was first treated with 1% $O_2$ in 99% $N_2$ for 2 hours at 900° F. Then it was treated with 1% $CCl_4$, 2.8% $H_2O$, and the remainder CO for 4 hours at 900° F. The $CCl_4$ was injected with a syringe pump into the CO stream which had been saturated with water at room temperature. This technique introduced about 10% more total chloride into the gas stream than the 3.5% HCl, 1% $H_2O$, balance CO gas mixture. After 4 hours of treatment, this sample was cooled to room temperature in flowing nitrogen. The sulfur concentration of the catalyst after treatment was 131 ppm.

EXAMPLE 8

Example 8 describes sulfur removal using a combination of the COAG and AOIG embodiments.

Another catalyst, comprising 0.8 wt. % platinum on a barium potassium L-zeolite containing 8 wt. % barium, was sulfided until it accumulated approximately 317 ppm sulfur and was substantially deactivated for paraffin dehydrocyclization. This catalyst will be called "Catalyst C", and will be used in later examples.

First, Catalyst C was heated with 1% $O_2$ in 99% $N_2$ for 16 hours at 1200° F. Then it was treated with a mixture of 3.5% HCl, 1% $H_2O$, and the balance CO at 900° F. for 48 hours. This mixture was produced by bubbling CO through an aqueous solution containing 32 wt. % HCl at room temperature. The sulfur concentration of the catalyst after treatment was 26 ppm.

EXAMPLE 9

Examples 9 through 13 describe sulfur removal in accordance with the AIOG embodiment.

A sample of Catalyst C was first contacted with a gaseous stream of 1% $O_2$ in 99% $N_2$ at 1200° F. for 16 hours. The platinum agglomerates ranged between 10 and 800 Å. Many particles were about 60 Å in diameter. Afterward, the catalyst was contacted with a mixture of 3.5% HCl, 1% $H_2O$, and the balance $H_2$ at 900° F. for 48 hours. This mixture was produced by bubbling $H_2$ through an aqueous solution containing 32 wt. % HCl at room temperature. The sulfur concentration of the catalyst after treatment was 19 ppm.

EXAMPLE 10

Example 10 shows that sulfur can be removed when the catalyst is treated with a mixture of $H_2$, HCl, and $H_2O$ at 800° F.

Another catalyst comprising 0.8 wt. % platinum on a barium potassium L-zeolite containing 8 wt. % barium, with sulfided until the catalyst had accumulated approximately 260 ppm sulfur and was substantially deactivated for paraffin dehydrocyclization.

The deactivated catalyst was treated in accordance with the AIOG embodiment. The catalyst was contacted with 1% $O_2$ in 99% $N_2$ at 1200° F. for 16 hours. Then it was contacted with a mixture of 3.5% HCl, 1% $H_2O$, and the balance $H_2$, at 800° F. for 48 hours. This gas mixture was produced by bubbling $H_2$ through an aqueous solution containing 32 wt. % HCl at room temperature. The sulfur concentration of the catalyst after treatment was 75 ppm.

EXAMPLE 11

This example shows that it is advantageous to simultaneously treat the catalyst with the reducing gas and the halogen acid gas.

Another sample of Catalyst C was treated with a variation of the AIOG embodiment. Catalyst C was contacted with 1% $O_2$ in 99% $N_2$ at 1200° F. for 16 hours. Then it was contacted with dry hydrogen at 900° F. for 24 hours. Finally, the catalyst was treated with a gaseous mixture of 3.5 HCl, 1% $H_2O$, and the balance $N_2$ at 900° F. for 24 hours. This mixture was produced by bubbling $N_2$ through an aqueous solution containing 32 wt. % HCl at room temperature. The sulfur concentration of the catalyst after treatment was 191 ppm.

EXAMPLE 12

This example shows that hydrogen bromide (HBr) can be used in place of hydrogen chloride.

Another catalyst comprising 0.8 wt. % platinum, 8 wt. % barium, and L-zeolite was sulfided until it accumulated 191 ppm of sulfur and was substantially deactivated for paraffin dehydrocyclization.

The deactivated catalyst was subject to the AIOG embodiment. The catalyst was contacted with the gaseous stream of 1% $O_2$ in 99% $N_2$ at 1200° F. for 32 hours. Then it was contacted with a gaseous stream comprising 3.0% HBr, 14.4% $H_2O$, in $H_2$ at 900° F. for 48 hours. The gaseous stream was formed by continuously injecting 0.1 cc per hour of an aqueous HBr solution containing 48 wt. % HBr into the hydrogen for 48 hours. The sulfur concentration of the catalyst after treatment was 78 ppm.

EXAMPLE 13

This example shows that oxidation at 1000° F. provides sufficient agglomeration of the platinum to allow for sulfur removal.

Another catalyst comprising 0.8 wt. % platinum on a barium potassium L-zeolite containing 8 wt. % barium, was sulfided until it accumulated 313 ppm of sulfur and was substantially deactivated for paraffin dehydrocyclization.

This deactivated catalyst was treated in accordance with the AIOG embodiment. It was first contacted with a gaseous stream of 1% $O_2$ in 99% $N_2$ at 1000° F. for 16 hours. This treatment produced platinum agglomerates ranging from about 10 to 100 Å, with the most abundant being approximately 60 Å. Then the catalyst was contacted with a mixture of 3.5% HCl, 1% $H_2O$, and the balance $H_2$ at 900° F. for 48 hours. This mixture was produced by bubbling $H_2$ through an aqueous solution containing 32 wt. % HCl at room temperature. The sulfur concentration of the catalyst after treatment was 70 ppm.

EXAMPLE 15

This example shows the combination of the sulfur removal procedure and the platinum redispersion procedure.

The treated catalyst from Example 2 contained 78 ppm sulfur and it was inactive even for cyclohexane dehydrogenation. It contained platinum agglomerates with a cubic shape having an edge length of approximately 30 to 80 Å.

To restore activity and redisperse the platinum, the catalyst was subjected to an oxychlorination step. This process was conducted as follows. The catalyst was contacted with wet air at a flow rate of 1400 GHSV, 1 atmosphere, and at a temperature of 1000° F. for one hour. Then the catalyst was contacted with a gaseous mixture of wet air at 1400 GHSV at a temperature of 900° F. for 2 hours, while chloride was injected as $CCl_4$. The total amount of injected $CCl_4$ was equivalent to 20 chlorine atoms per platinum atom. Thereafter, the wet air mixture was continued at 1400 GHSV and 900° F. for an additional hour without $CCl_4$ injection. Then, dry nitrogen was contacted with the catalyst at 1400 GHSV and 900° F. for 10 minutes. Following that, dry hydrogen was contacted with the catalyst at 1400 GHSV and a temperature of 900° F. for an hour. After this procedure, the catalyst was analyzed by TEM and it was observed that the only visible platinum was present in agglomerates of 10 Å or smaller. The catalyst was tested for paraffin dehydrocyclization and it was found to have about 40% of the activity of the fresh catalyst (both measurements were taken after 20 hours on-stream).

The embodiments of this invention which are exemplified above are intended solely as illustrations of the invention. They should not be interpreted as limiting the scope of the invention to just those features which are exemplified. As those familiar with this area of research will appreciate, there are numerous variations of the invention as defined in the following claims which

TABLE I

SULFUR REMOVAL FROM ZEOLITE REFORMING CATALYSTS CONTAINING A GROUP VIII METAL

| Example[1,2] No | Step 1 (1% $O_2$, 99% $N_2$) Time (Hr) | Step 1 Temp (°F.) | Step 2 Gas Composition (%) CO | $H_2$ | HCl | $H_2O$ | $CCl_4$ | HBr | Step 2 Time (Hr) | Step 2 Temp (°F.) | Step 3 (3.5% HCl, 1% $H_2O$ 95.5% $N_2$) Time (Hr) | Step 3 Temp (°F.) | Sulfur ppm Initial | Sulfur ppm Final | Platinum Agglom Size (Å) |
|---|---|---|---|---|---|---|---|---|---|---|---|---|---|---|---|
| COAG | | | | | | | | | | | | | | | |
| 1 | 16 | 900 | 89.5 | — | 10.0 | 0.5 | — | — | 102 | 900 | — | — | 325 | 20 | 40–340 |
| 2 | 19 | 900 | 95.5 | — | 3.5 | 1.0 | — | — | 24 | 900 | — | — | 400 | 78 | 30–80 |
| 3 | 24 | 900 | 89.5 | — | 10.0 | 0.5 | — | — | 3 | 900 | — | — | 325 | 160 | — |
| 4 | — | — | 95.5 | — | 3.5 | 1.0 | — | — | 21 | 900 | — | — | 400 | 138 | — |
| 5 | 3 | 980 | 95.5 | — | 3.5 | 1.0 | — | — | 3 | 1050 | — | — | 325 | 98 | — |
| 6 | 3 | 900 | 50.0 | — | 50.0 | — | — | — | 3 | 900 | — | — | 440 | 184 | — |
| 7 | 2 | 900 | 96.2 | — | — | 2.8 | 1.0 | — | 4 | 900 | — | — | 400 | 131 | — |
| COAG and AlOG | | | | | | | | | | | | | | | |
| 8 | 16 | 1200 | 95.5 | 0 | 3.5 | 1.0 | — | — | 48 | 900 | — | — | 317 | 26 | — |
| AlOG | | | | | | | | | | | | | | | |
| 9 | 16 | 1200 | — | 95.5 | 3.5 | 1.0 | — | — | 48 | 900 | — | — | 317 | 19 | 10–800 |
| 10 | 16 | 1200 | — | 95.5 | 3.5 | 1.0 | — | — | 48 | 800 | — | — | 260 | 75 | — |
| 11 | 16 | 1200 | — | 100 | — | — | — | — | 24 | 900 | 24 | 900 | 317 | 191 | — |
| 12 | 32 | 1200 | — | 82.6 | — | 14.4 | — | 3.0 | 48 | 900 | — | — | 191 | 78 | — |
| 13 | 16 | 1000 | — | 95.5 | 3.5 | 1.0 | — | — | 48 | 900 | — | — | 313 | 70 | 10–100 |

[1]COAG Carbon Monoxide/Halogen Acid Agglomerrsing Embodiment
AlOG Agglomeralum in an Oxidising $O_2$ Embodiment
[2]All steps were carried out at a pressure of one atmosphere and a gas flow rate of 150 OHSV

EXAMPLE 14

This example shows an oxychlorination procedure.

A catalyst comprising 0.8 wt. % platinum on a barium potassium L-zeolite containing 8 wt. % barium, was reduced in $H_2$ at 900° F. and 1 atmosphere for one hour and then purged with $N_2$. Thereafter, the catalyst was heated in dry air for 3 hours at 1000° F. and 1 atmosphere. This reduced the dehydrocyclization activity to 50% of the fresh catalyst. Furthermore, the platinum had been agglomerated by this treatment. The TEM showed that about 70% of the platinum agglomerates had a diameter between 70 and 80 Å.

To redisperse the platinum and restore activity to the catalyst, it was subjected to an oxychlorination procedure. This process was conducted as follows. The catalyst was contacted with the gaseous mixture of wet air at 1400 GHSV, 1 atmosphere and a temperature of 950° F. for 2 hours, while chlorine was injected as $CCl_4$ in an amount sufficient to expose the catalyst to 20 chlorine atoms per platinum atom. Then, the wet air was continued at 1400 GHSV at a temperature of 950° F. for one hour without $CCl_4$ injection. Thereafter, dry nitrogen was introduced at 1400 GHSV, 1 atmosphere and 900° F. for one hour. Following that, dry hydrogen was contacted with the catalyst at 1400 GHSV, 1 atmosphere and a temperature of 900° F. for one hour. The catalyst was tested for paraffin dehydrocyclization and it was found that the activity was equal to the fresh catalyst. Furthermore, TEM showed that the platinum was redispersed by the treatment. All of the platinum was present in agglomerates having diameters less than 10 Å.

have not been exemplified but which will achieve equivalent results.

What is claimed is:

1. A process for removing sulfur from a sulfur contaminated zeolite catalyst containing platinum which comprises agglomerating the platinum *with an oxygen-containing gas* under agglomerating conditions which will result in greater than 50% of the platinum forming agglomerates greater than 50 Å in diameter, and thereafter removing sulfur from the catalyst wherein the sulfur is removed by contacting said catalyst after agglomeration [concurrently] with *a* carbon monoxide gas and a halogen acid gas, that does not contain sulfur, under conditions effective to remove sulfur from the catalyst *wherein the catalyst is contacted with the halogen acid gas subsequent to or simultaneously with its contact with the carbon monoxide gas.*

2. A process as recited in claim 1 wherein the zeolite is a large pore zeolite.

3. A process as recited in claim 2 wherein the large pore zeolite is L zeolite.

4. A process as recited in claim 3 wherein the platinum is agglomerated by contacting the catalyst with an oxygen-containing gas at a temperature between 800° F. and 1200° F.

5. A process as recited in claim 4 wherein the oxygen containing gas comprises from between 1% and 50% oxygen and wherein the catalyst is contacted with said oxygen containing gas at a gas rate between 50 and 5000 GHSV, and a pressure between 1 and 30 atmospheres, for a time between 1 and 100 hours.

6. A process as recited in claim 5 wherein the oxygen containing gas comprises from between 2% and 21% oxygen and wherein the catalyst is contacted with said oxygen containing gas at a temperature between 900° F. and 1050° F. at a gas rate between 150 and 1500 GHSV, at a pressure between 1 and 10 atmospheres and for a time between 8 and 50 hours.

7. A process as recited in claim 1 wherein prior to the platinum agglomeration said catalyst is contacted with a gas comprising between 0.1% and 2% oxygen, at a temperature between 500° and 900° F., at a pressure between 1 and 30 atmospheres, at a gas rate between 50 and 5000 GHSV for a time between 1 and 24 hours to remove carbon from the catalyst.

8. A process as recited in claim 1 wherein the halogen acid is hydrogen chloride.

9. A process as recited in claim 8 wherein the platinum is agglomerated and the sulfur is removed from the catalyst by contacting the catalyst with a gas that comprises greater than 2% carbon monoxide, and greater than 0.1% hydrogen chloride, at a pressure between 1 and 30 atmospheres, at a gas rate between 50 and 5000 GHSV, and a temperature between 800° F. and 1200° F., for greater than 1 hour.

10. A process as recited in claim 9 wherein the platinum is agglomerated and the sulfur removed from the catalyst by contacting the catalyst with a gas that comprises between 50 and 99% carbon monoxide, greater than 1% hydrogen chloride, at a pressure between 1 and 10 atmospheres, at a gas rate between 150 and 1500 GHSV, and a temperature between 800° and 1000° F., for greater than 3 hours.

11. A process as recited in claim 10 wherein prior to the platinum agglomeration said catalyst is contacted with a gas comprising between 0.1% and 2.0% oxygen, at a temperature between 500° F. and 900° F., at a pressure between 1 and 30 atmospheres, at a gas rate between 50 and 5000 GHSV for a time between 1 and 24 hours to remove carbon from the catalyst.

12. A process as recited in claim 1 wherein the zeolite is an intermediate pore zeolite.

13. A process as recited in claim 12 wherein the intermediate pore zeolite is silicalite.

14. A process for removing carbon and sulfur from a carbon and sulfur contaminated large-pore zeolite catalyst containing platinum which comprises:

(a) contacting the catalyst with a gas containing between 0.1% and 2% oxygen, at a temperature between 500° F. and 900° F., at a pressure between 1 and 10 atmospheres, and a gas rate between 150 and 1500 GHSV for a time between 1 and 24 hours to remove carbon from the catalyst; and (b) contacting the catalyst from step (a) with a gas comprising greater than 1% hydrogen chloride and between 50% and 99% carbon monoxide, at a temperature between 800° F. and 1000° F., for greater than 3 hours at a gas rate between 150 and 1500 GHSV and a pressure between 1 and 10 atmospheres to agglomerate greater than 50% of the platinum into agglomerates of greater than 50 Å in diameter and to remove sulfur.

15. A process as recited in claim 14 wherein the catalyst from step (b) is contacted with a chloride or chlorine-containing gas under oxychlorination conditions to redisperse the platinum.

16. A process as recited in claim 15 wherein the oxychlorination conditions comprise contacting the catalyst with the chloride or chlorine-containing gas sufficient to achieve a ratio greater than 4 chlorine atoms for every 1 platinum atom.

17. A process as recited in claim 16 wherein the oxychlorination conditions comprise contacting the catalyst with the chloride or chlorine-containing gas in an amount sufficient to achieve a ratio of between 4:1 and 1000:1 chlorine atoms for every platinum atom.

18. The process as recited in claim 14 wherein the catalyst from step (b) is (a) contacted with a chloride or chlorine-containing gas in the presence of an oxygen-containing gas containing greater than 0.1%, $O_2$, for between 1 and 24 hours;

(b) purged with a dry inert gas at a temperature between 600° F. and 1000° F. for between 0.1 and 5 hours; and (c) contacted with dry hydrogen at a temperature of between 600° F. to 1000° F. for less than 5 hours.

19. A process for regenerating a carbon and sulfur-contaminated, monofunctional, large-pore zeolite reforming catalyst comprising platinum and L-zeolite which comprises:

(I) a carbon removal step which comprises:

(a) contacting the catalyst with a gas comprising between 0.1% and 2.0% oxygen, at a temperature between 500° F. and 900° F., at a gas rate between 150 and 1500 GHSV, and a pressure 1 and 10 atmospheres, for a time between 1 and 24 hours to remove carbon from the catalyst;

(II) a platinum agglomeration and sulfur removal step wherein greater than 50% of the platinum is agglomerated into agglomerates of greater than 50 Å in diameter which comprises:

(a) contacting the catalyst from step (I)(a) with a gas comprising greater than 1% hydrogen chloride in carbon monoxide, at a temperature between 900° F. and 1000° F., at a pressure between 1 and 10 atmospheres, for greater than 24 hours at a gas rate between 150 and 1500 GHSV;

(III) a procedure to redistribute the platinum which comprises:

(a) contacting the catalyst from step (II)(a) with a chloride-containing compound in a gas comprising between 1% and 21% oxygen and 1% to 4% water, in an amount sufficient to provide between 5 and 200 chloride atoms for every platinum atom, for a time between 1 and 3 hours, and a temperature between 900° F. and 1000° F., and a pressure between 1 and 10 atmospheres; and (b) stopping the flow of the gas in step (III)(a) and contacting the catalyst with dry nitrogen at a temperature between 850° F. and 950° F. and at a gas rate between 150 and 1500 GHSV for a time between 0.1 and 2.0 hours and a pressure between 1 and 10 atmospheres; and (c) contacting the catalyst with dry hydrogen at a temperature between 800° F. and 950° F. and a pressure between 1 and 10 atmospheres for less than 2 hours at a gas rate of between 150 and 1500 GHSV.

20. A process for regenerating a carbon and sulfur-contaminated, monofunctional, large-pore zeolite reforming catalyst comprising platinum and L-zeolite which comprises:

(I) a carbon removal step which comprises:

(a) contacting the catalyst with a gas comprising between 0.1% and 2.0% oxygen, at a temperature between 500° F. and 900° F., at a gas rate between 150 and 1500 GHSV at a pressure between 1 and 10 atmospheres, for a time between 1 and 24 hours to remove carbon from the catalyst;

(II) a platinum agglomeration and sulfur removal step which comprises:

(a) contacting the catalyst from step (I)(a) with a gas comprising between 2% and 21% oxygen, at a temperature between 900° F. and 1050° F., a flow rate between 150 and 1500 GHSV, and a pressure between 1 to 10 atmospheres, for a time between 8 and 50 hours to agglomerate greater than 50% of the platinum into agglomerates of greater than 50 Å in diameter;

(b) contacting the catalyst from step (II)(a) concurrently with carbon monoxide gas and hydrogen chloride gas for a time between 8 and 50 hours, at a temperature between 900° F. and 1000° F., a pressure between 1 and 10 atmospheres, and a gas rate of between 150 and 1500 GHSV to remove sulfur;

(III) an oxychlorination procedure to redistribute the platinum which comprises:

(a) contacting the catalyst from step (II)(b) with a chloride-containing compound in a gas comprising between 1% and 21% oxygen and from 1% to 4% water in an amount sufficient to provide between 5 and 200 chloride atoms for every platinum atom, for a time between 1 and 3 hours, and a temperature between 900° F. and 1000° F., and a pressure between 1 and 10 atmospheres; and (b) stopping the flow of gas in step (III)(a) and contacting the catalyst with dry nitrogen at a temperature between 850° F. and 950° F., a pressure between 1 and 10 atmospheres, and a gas rate of between 150 and 1500 GHSV, for a time between 0.1 and 2.0 hours; and (c) contacting the catalyst with dry hydrogen at a temperature between 800° F. and 950° F., and a pressure between 1 and 10 atmospheres, for less than 2 hours at a gas rate of between 150 and 1500 GHSV.

*21. A process for removing sulfur from a sulfur contaminated zeolite catalyst containing platinum, said process comprising:*

*(a) subjecting the contaminated catalyst to a carbon burn to remove carbon;*

*(b) treating the zeolite catalyst contaminated with sulfur by (i) agglomerating the platinum with an oxygen-containing gas under agglomerating conditions which result in greater than 50% of the platinum forming agglomerate greater than 50 Å in diameter, and (ii) thereafter removing sulfur from the catalyst by contacting said catalyst with a halogen acid gas and a reducing gas, wherein the reducing gas is hydrogen, the concentration of said reducing gas being 10% or more of the total gas volume, and the catalyst being contacted with the halogen acid gas subsequent to or simultaneously with its contact with the reducing gas;*

*(c) redispersing the platinum within the catalyst.*

*22. A process according to claim 21, wherein the catalyst is simultaneously contacted with the halogen acid gas and the reducing gas.*

*23. A process according to claim 22, wherein the catalyst is contacted with the gases for at least one hour.*

*24. A process according to claim 23, wherein the catalyst is contacted with the gases for at least about 8 hours.*

*25. A process according to claim 23, wherein at least 59% of the sulfur is removed from the catalyst.*

*26. A process according to claim 21, wherein the zeolite is a large pore zeolite.*

*27. A process according to claim 26, wherein the large pore zeolite is L zeolite.*

*28. A process according to claim 27, wherein the platinum is agglomerated by contacting the catalyst with an oxygen-containing gas at a temperature between 800° F. and 1200° F.*

*29. A process according to claim 28, wherein the oxygen-containing gas comprises from between 1% and 50% oxygen, and wherein the catalyst is contacted with the oxygen-containing gas at a gas rate between 50 and 5000 GHSV, and a pressure between 1 and 30 atmospheres, for a time between 1 and 100 hours.*

*30. A process according to claim 29, wherein the oxygen-containing gas comprises from between 2% and 21% oxygen, and wherein the catalyst is contacted with the oxygen-containing gas at a temperature between 900° F. and 1050° F. at a gas rate between 150 and 1500 GHSV, at a pressure between 1 and 10 atmospheres and for a time between 8 and 50 hours.*

*31. A process according to claim 21, wherein prior to platinum agglomeration the catalyst is contacted with a gas comprising between 0.1% and 2% oxygen, at a temperature between 500° F. and 900° F., at a pressure between 1 and 30 atmospheres, at a gas rate between 50 and 5000 GHSV for a time between 1 and 24 hours to remove carbon from the catalyst.*

*32. A process according to claim 21, wherein the halogen acid gas is hydrogen chloride.*

*33. A process according to claim 21, wherein the catalyst is a carbon and sulfur-contaminated, monofunctional, large-pore zeolite reforming catalyst comprising platinum and L-zeolite.*

* * * * *